(12) United States Patent
Hashimoto et al.

(10) Patent No.: US 9,674,288 B2
(45) Date of Patent: Jun. 6, 2017

(54) CONTROLLER CAPABLE OF REDUCING COMMUNICATION CYCLE TIME

(71) Applicant: FANUC Corporation, Minamitsuru-gun, Yamanashi (JP)

(72) Inventors: Arito Hashimoto, Minamitsuru-gun (JP); Shogo Inoue, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 114 days.

(21) Appl. No.: 14/722,529

(22) Filed: May 27, 2015

(65) Prior Publication Data

US 2015/0350345 A1    Dec. 3, 2015

(30) Foreign Application Priority Data

May 29, 2014  (JP) ................................ 2014-110992

(51) Int. Cl.
    *H04L 29/08*    (2006.01)
    *H04L 29/12*    (2006.01)

(52) U.S. Cl.
    CPC .......... *H04L 67/16* (2013.01); *H04L 61/2069* (2013.01); *H04L 67/32* (2013.01); *H04L 61/2038* (2013.01); *Y02P 90/087* (2015.11); *Y02P 90/10* (2015.11); *Y02P 90/18* (2015.11)

(58) Field of Classification Search
None
See application file for complete search history.

(56) References Cited

U.S. PATENT DOCUMENTS

| 5,353,284 | A  | * | 10/1994 | Shiobara | ............... | G06F 13/128 |
|---|---|---|---|---|---|---|
|  |  |  |  |  |  | 370/463 |
| 7,134,138 | B2 | * | 11/2006 | Scherr | ..................... | G06F 21/80 |
|  |  |  |  |  |  | 711/E12.094 |
| 7,716,662 | B2 | * | 5/2010 | Seiden | ...................... | G06F 8/61 |
|  |  |  |  |  |  | 717/173 |
| 7,848,746 | B2 | * | 12/2010 | Juels | ................... | H04L 63/0492 |
|  |  |  |  |  |  | 380/258 |

(Continued)

FOREIGN PATENT DOCUMENTS

| JP | H05-136788 A | 6/1993 |
|---|---|---|
| JP | H07-30576 A | 1/1995 |

(Continued)

OTHER PUBLICATIONS

"Protocol specification for FA control network standard," Japanese Industrial Standards JIS B 3521, 2004, pp. 1-87, http://kikakurui.com/b3/B3521-2004-01.html [in Japanese language].

(Continued)

*Primary Examiner* — Ninos Donabed
(74) *Attorney, Agent, or Firm* — Drinker Biddle & Reath LLP

(57) ABSTRACT

A controller (node) divides all nodes connected to a network into several network groups, and gives the division network groups network identification numbers for identifying them. A token frame contains a network identification number. This network identification number enables data to be shared among all the nodes connected to the network while a token for each network group is circulated only in the network group.

1 Claim, 13 Drawing Sheets

(56) References Cited

U.S. PATENT DOCUMENTS

| | | | |
|---|---|---|---|
| 2002/0112178 A1* | 8/2002 | Scherr | G06F 21/80 726/4 |
| 2003/0061389 A1 | 3/2003 | Mazza | |
| 2007/0186105 A1* | 8/2007 | Bailey | H04L 63/0492 713/168 |
| 2007/0279227 A1* | 12/2007 | Juels | H04L 63/0492 340/572.1 |
| 2008/0034228 A1* | 2/2008 | Shear | G06Q 20/3674 713/194 |
| 2008/0065892 A1* | 3/2008 | Bailey | H04L 63/0492 713/171 |
| 2008/0103805 A1* | 5/2008 | Shear | G06Q 20/3674 705/1.1 |
| 2008/0109240 A1* | 5/2008 | Shear | G06Q 20/3674 705/1.1 |
| 2008/0109242 A1* | 5/2008 | Shear | G06Q 20/3674 705/1.1 |
| 2008/0253667 A1* | 10/2008 | Shiraishi | G06F 3/1204 382/232 |
| 2010/0063892 A1* | 3/2010 | Keronen | G06Q 30/04 705/26.1 |
| 2010/0312768 A1* | 12/2010 | Shear | G06Q 20/3674 707/740 |
| 2013/0268687 A1* | 10/2013 | Schrecker | H04W 12/06 709/229 |
| 2013/0268758 A1* | 10/2013 | Schrecker | G06F 21/00 713/168 |
| 2013/0268766 A1* | 10/2013 | Schrecker | G06F 21/34 713/185 |
| 2013/0268767 A1* | 10/2013 | Schrecker | G06F 21/31 713/185 |
| 2013/0322622 A1* | 12/2013 | Bailey | H04L 63/0492 380/44 |

FOREIGN PATENT DOCUMENTS

| | | |
|---|---|---|
| JP | H08-223192 A | 8/1996 |
| JP | 2001-257679 A | 9/2001 |
| WO | WO-2014-061076 A1 | 4/2014 |

OTHER PUBLICATIONS

Notification of Reasons for Refusal issued Nov. 29, 2016 in Japanese Patent Application No. 2014-110992 (2 pages) with an English Translation (2 pages).

* cited by examiner

CONTROLLER CAPABLE OF REDUCING COMMUNICATION CYCLE TIME

RELATED APPLICATION DATA

This application claims priority under 35 U.S.C. §119 and/or §365 to Japanese Application No. 2014-110992 filed May 29, 2014, the entire contents is incorporated herein by reference.

BACKGROUND OF THE INVENTION

1. Field of the Invention

The present invention relates to numerical controllers, robot controllers, and programmable logic controllers which control machine tools and industrial machinery.

2. Description of the Related Art in some manufacturing lines including a plurality of manufacturing facilities (such as machine tools, robots, and industrial machinery), controllers (such as numerical controllers, robot controllers, and programmable logic controllers) for controlling the manufacturing facilities are connected through a network, and data on the controllers is shared to perform synchronous control, cooperative control, or the like. In such a case, data are shared among the controllers through a network employing a common memory system.

In a network employing a common memory system, a predetermined region of a memory of each of controllers (nodes) constituting the network is set as a common memory region. This common memory region includes an own-node area for storing data to be transmitted from the own node to the other nodes and other-node areas for storing data transmitted from the other nodes. Further, each node generates an own-node data frame containing own-node data obtained from the own-node area in the common memory region and its own node number, and transmits the own-node data frame over the network.

A data frame of each node needs to be transmitted to all the other nodes connected to the network, and therefore broadcasting is used. The data frame transmitted by broadcasting is received by all the other nodes connected to the network. Each receiving node stores source node data obtained from the received data frame in the source node area among the other-node areas in the common memory region. This enables data sharing among all the nodes connected to the network (see FIG. 13).

In the case where each node performs broadcasting at an individual timing, a heavy load may be temporarily placed on the network. To cope with this, a technique is employed in which using a transmission right called a token, only a node holding the token transmits an own-node data frame. After the token-holding node transmits the own-node data frame, the token-holding node generates a token frame containing the number of a next token-holding node, and transmits the token frame over the network to pass the token to the next token-holding node. This is repeated to circulate the token, and all the nodes connected to the network sequentially transmit own-node data frames. When the token is passed back to the node which held the token first, data update is completed for all the nodes connected to the network. In other words, the cycle of the token determines a communication cycle.

As such a technique for circulating a token among a plurality of nodes connected to a network to share data among the nodes, JIS B 3521 discloses FL-net (OPCN-2) standardized by the Japan Electrical Manufacturer's Association.

In a network in which a token is circulated, all nodes connected to the network sequentially transmit data. Accordingly, there is the following problem: as the number of nodes connected to the network increases, the length of the circulation cycle of the token increases, and the communication cycle time of the entire network increases.

One conceivable way to reduce the number of nodes connected to the above-described network and reduce the communication cycle time is to physically divide the network. However, this method has the problem that nodes in each division network cannot share data of nodes outside the division network (see FIG. 14).

Moreover, in the above-described network, since the token circulates among all the nodes connected to the network, the data update cycles of the nodes cannot be adjusted, and the same data update cycle as that of a node which requires a short data update cycle is also applied to a node in which a long data update cycle is acceptable. Accordingly, there is a problem that needless data communications are performed to place a needless load on the network.

SUMMARY OF THE INVENTION

Accordingly, an object of the present invention is to provide a controller which can solve the above-described problems of prior arts and which can reduce a communication cycle time.

A controller according to the present invention is configured to circulate a token among a plurality of nodes and allow data on each node to be shared, the plurality of nodes being a plurality of controllers connected to a network. The controller includes a data storage unit for sharing data among the plurality of nodes connected to the network; a network information storage unit for storing at least one set of network information containing a network identification number for identifying at least one network group including own node and at least one other node specified in advance, of the nodes connected to the network, and a connected node list of the network group to which the own node belongs; a token holding unit for holding a token of the network group to which the own node belongs; a transmitting unit for performing transmission to the all the other nodes connected to the network; and a receiving unit for performing reception from the other node connected to the network. The transmitting unit includes a transmission type determination unit for determining a type (token or data) of a frame to be transmitted; an own-node transmit data generation unit for obtaining own-node data from an own-node data region of the data storage unit and generating an own-node data frame if it is determined that the type of the frame to be transmitted is data; a network identification number-added token generation unit for, if it is determined that the type of the frame to be transmitted is a token, selecting a next token-holding node from a connected node list of the network group that holds the token, generating a token frame addressed to the next token-holding node, and adding the network identification number of the network group to the generated token frame; and a frame transmission unit for transmitting the frame to be transmitted to all the other nodes connected to the network by broadcasting. The receiving unit includes a frame receiving unit for receiving a frame from other node connected to the network; a network identification number determination unit for checking whether or not the received frame contains the network identification number of the network group to which the own node belongs, and discarding the received frame if the received frame contains a network identification number different from the network identification number of the network group to which the own node belongs; a received type determination unit for determining a type (token or data) of the received frame; an other-node received-data storage unit for, if it is determined that the type of the received frame is data, obtaining source node data from the data frame and storing the obtained source node data in a source node area among other-node areas of the data storage unit; and a token determination unit for, if it is determined that the type of the received frame is a token, checking whether or not the token is addressed to the own node, and storing in the token holding unit the token of the network group identified with the network identification number contained in the token if the token is addressed to the own node.

In the present invention, all the nodes connected to the network are divided into defined network groups but only logically divided. Accordingly all the nodes can communicate with each other. Compared to the entire network, each network group contains a smaller number of nodes among which a token is circulated, and therefore has a shorter token circulation cycle and a shorter communication cycle time. Data can be shared on the entire network irrespective of each network group. Thus, the communication cycle time of the entire network can be reduced while data is shared among all the nodes. Moreover, since a token circulates in each network group, the data update cycle of nodes can be adjusted for each network group.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

Figure 1:
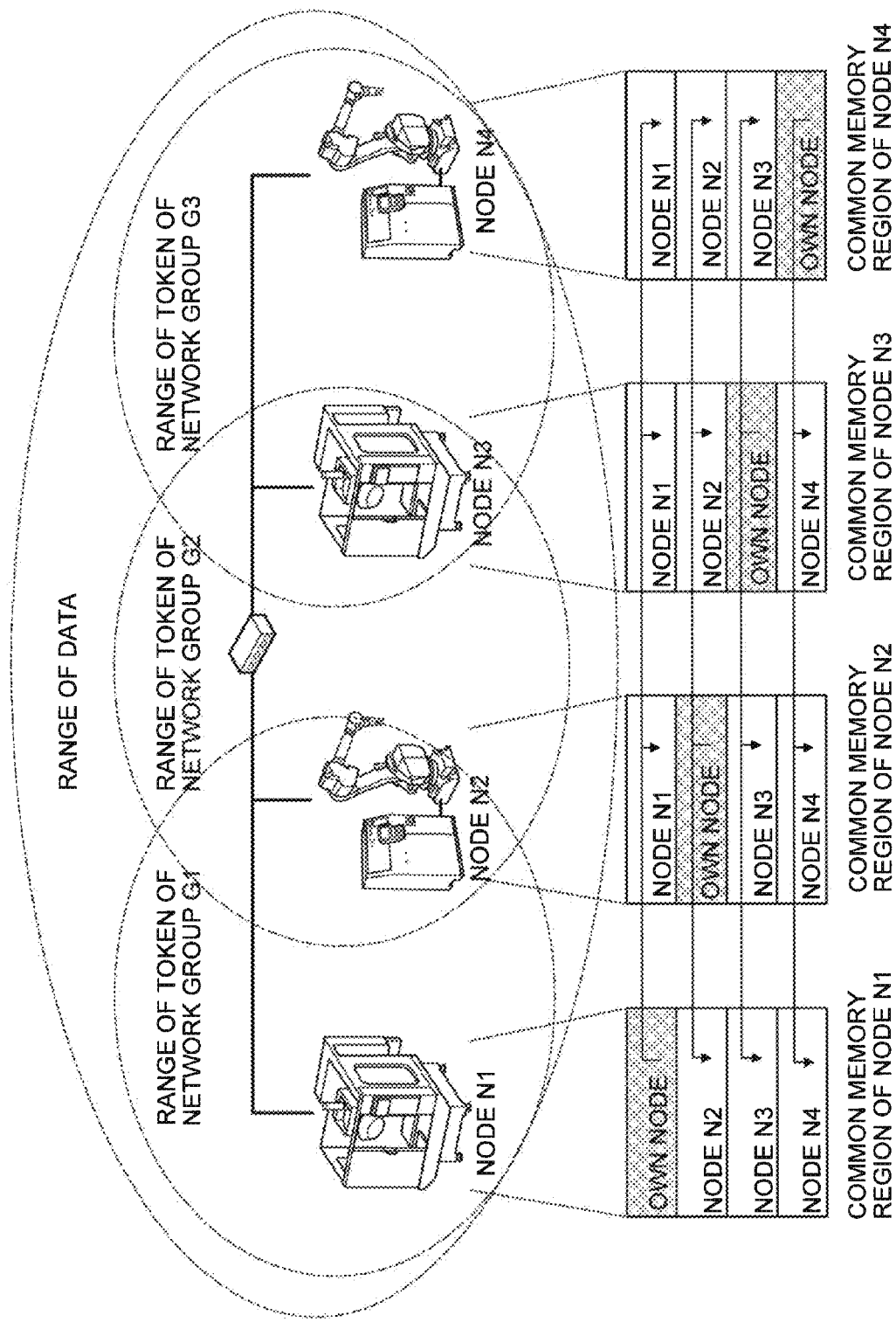
FIG. 1 is a view showing data sharing among nodes for the case where a controller according to the present invention divides all nodes connected to a network into network groups.

FIG. 1 is a view showing data sharing among nodes for the case where a controller according to the present invention divides all the nodes connected to a network into network groups.

A controller (node) according to the present invention divides all nodes connected to a network into a plurality of network groups defined in advance. These network groups are identified with network identification numbers. A network identification number for identifying a network group is added to a token frame (see FIG. 3). Using the network identification numbers, a system is configured in which each of tokens for respective network groups circulates only in the corresponding network group. Thus, the controller according to the present invention enables data to be shared among all the nodes connected to the network while each token is being circulated among only the nodes in the corresponding defined network group, of all the nodes connected to the network.

As shown in FIG. 1, network groups to which nodes N1, N2, N3, and N4 connected to the network belong are defined in advance as follows: the nodes and N2 belong to a network group G1 with network identification number 1; the nodes N2 and N3 belong to a network group G2 with network identification number 2; and the nodes N3 and N4 belong to a network group G3 with network identification number 3.

Figure 2:
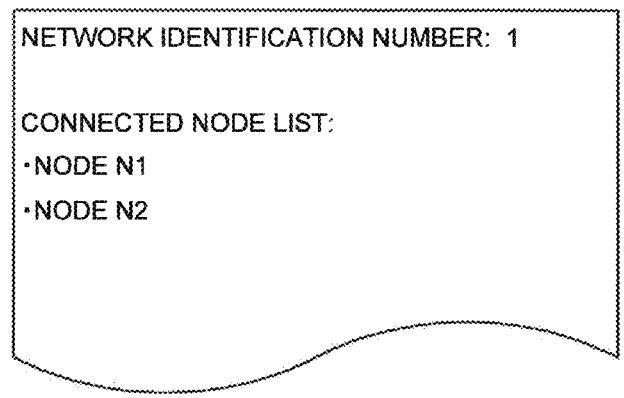
FIG. 2 is a view showing network information on a network group G1.

FIG. 2 is a view showing network information on the network group G1. A network information storage unit 14 (see FIG. 8) of the node N1 stores network information on the network group G1 to which the node N1 belongs. As the network information on the network group G1, 1 is stored in a network identification number, and the nodes N1 and N2 are stored in a connected node list.

Figure 3:
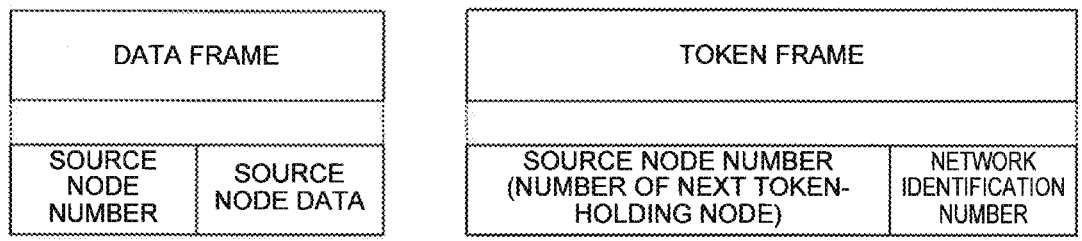
FIG. 3 is a diagram showing a data frame and a token frame.

FIG. 3 is a diagram showing a data frame and a token frame.

In the network group G1, to which the nodes N1 and N2 belong, the node N1 is assumed to hold a token. Since the node N1 holds the token of the network group G1, the node N1 itself obtains own-node data from an own-node area in a common memory region, generates an own-node data frame, and transmits the generated own-node data frame to all the other nodes (nodes N2, N3, and N4) connected to the network by broadcasting.

Figure 4:
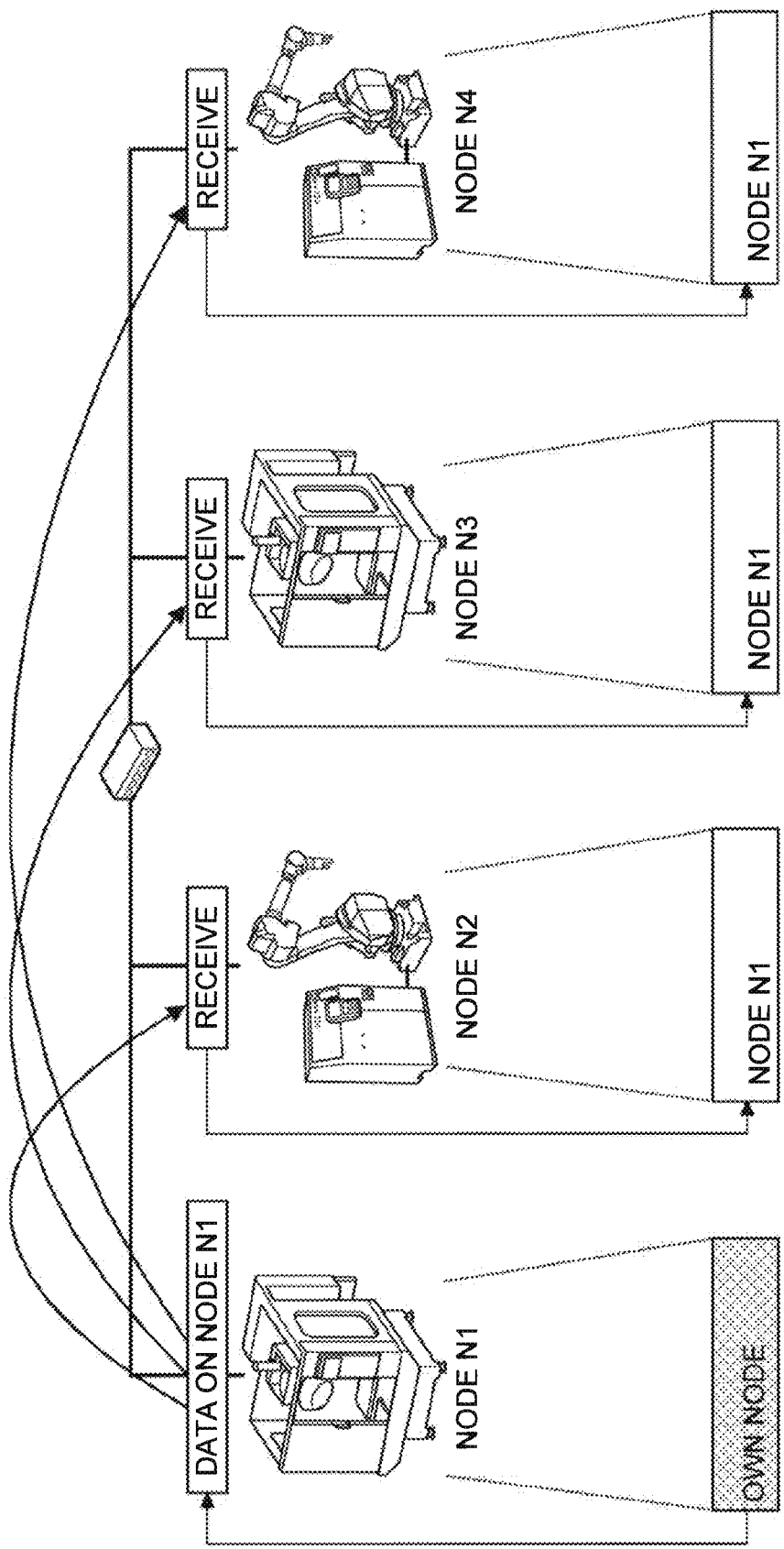
FIG. 4 is a view showing data transmission from a token-holding node N1 of the network group G1.

FIG. 4 is a view showing data transmission from the token-holding node N1 of the network group G1.

As shown in FIG. 4, since the frame transmitted from the node N1 contains no network identification number, each of the nodes N2, N3, and N4 receives the frame. Moreover, since the type of the received frame is data frame, each of the nodes N2, N3, and N4 obtains node-N1 data from the data frame, and stores the obtained node-N1 data in a node-N1 area in the common memory region.

Figure 5:
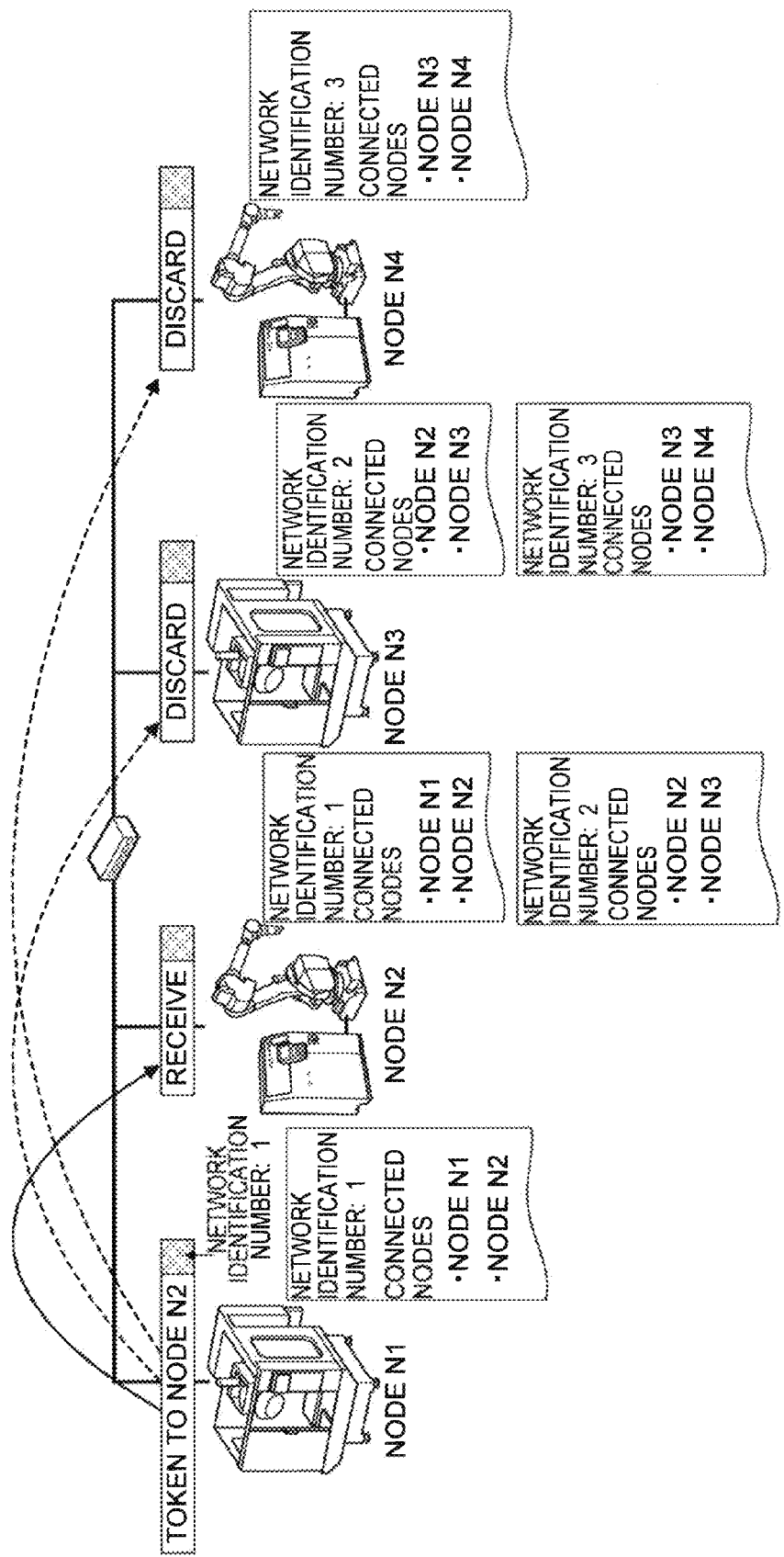
FIG. 5 is a view showing token transmission from the token-holding node N1 of the network group G1.

FIG. 5 is a view showing token transmission from the token-holding node N1 of the network group G1.

Nodes which belong to network identification number 1 (group G1) are the nodes N1 and N2. Connected nodes (list) for network identification number 1 contain the nodes N1 and N2. Nodes which belong to network identification number 2 (group G2) are the nodes N2 and N3. Connected nodes (list) for network identification number 2 contain the nodes N2 and N3. Nodes which belong to network identification number 3 (group G3) are the nodes N3 and N4.

Connected nodes (list) for network identification number 3 contain the nodes N3 and N4.

After transmitting the own-node data, the node N1 selects the node N2 as a next token-holding node from the connected node list of the network group G1, and generates a token frame (see FIG. 3) addressed to the node N2. The node N1 adds the network identification number 1 of the network group G1 to the generated token frame, and transmits the token frame to all the other nodes (nodes N2, N3, and N4) connected to the network by broadcasting.

The node N2 receives the frame transmitted from the node N1 because the frame contains a network identification number and the network identification number matches the network identification number of the network group to which the own node (node N2) belongs. The node N2 stores the token of the network group G1 in a token holding unit 12 (see FIG. 8) because the type of the received frame is the token and the token is addressed to the own node.

Each of the nodes N3 and N4 discards the frame transmitted from the node N1 because the frame transmitted from the node N1 contains a network identification number and the network identification number is different from the network identification number of the network group to which the own node (nodesN3, nodeN4) belongs.

Figure 6:
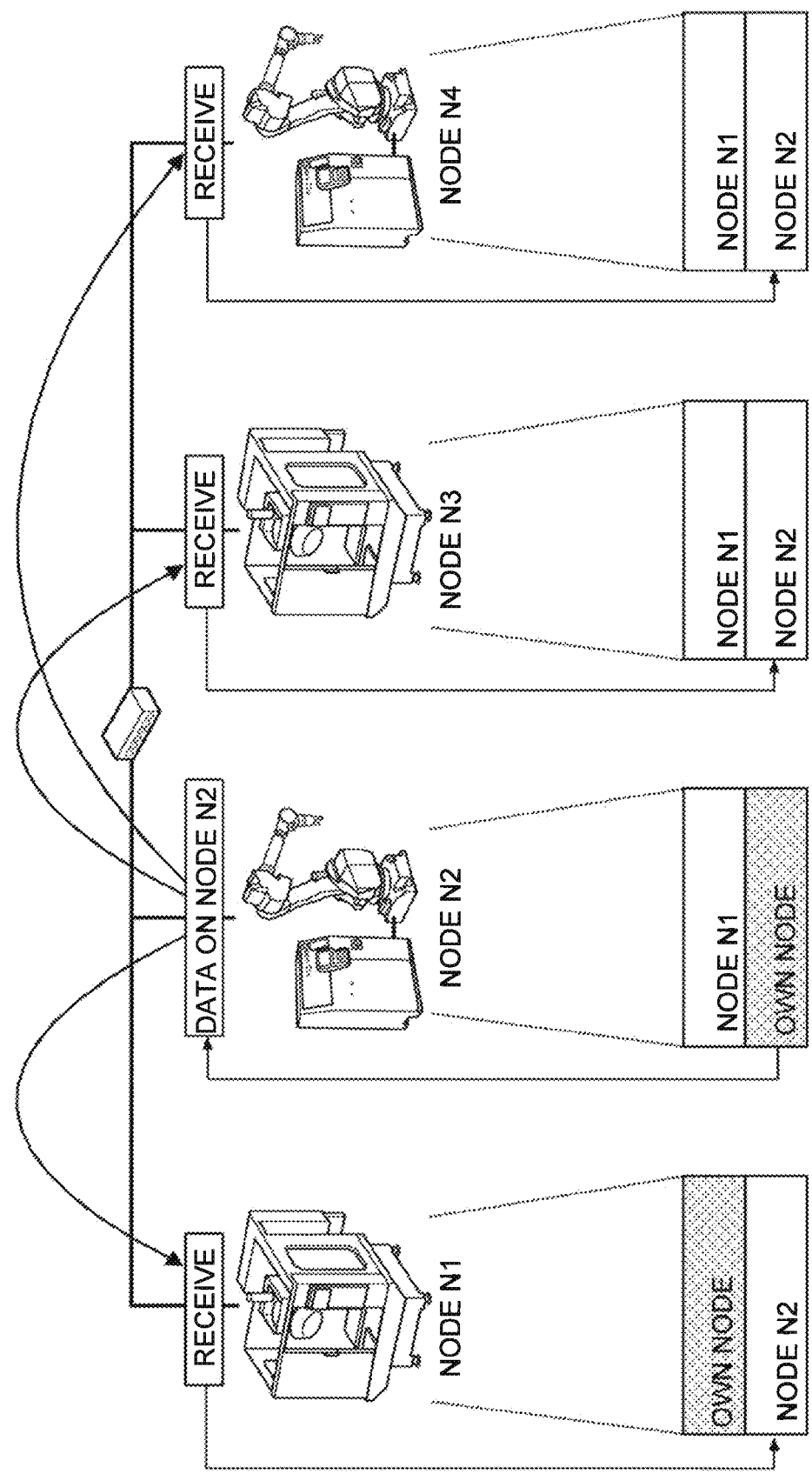
FIG. 6 is a view showing data transmission from a token-holding node N2 of the network group G1.

FIG. 6 is a view showing data transmission from the token-holding node N2 of the network group G1.

Since the node N2 holds the token of the network group G1, the node N2 itself obtains own-node data from an own-node area in a common memory region, generates an own-node data frame, and transmits the generated own-node data frame to all the other nodes (nodes N1, N3, and N4) connected to the network by broadcasting. Since the frame transmitted from the node N2 contains no network identification number, each of the nodes N1, N3, and N4 receives the frame. Moreover, since the type of the received frame is data frame, each of the nodes N1, N3, and N4 obtains node-N2 data from the data frame, and stores the obtained node-N2 data in a node-N2 area in the common memory region.

Figure 7:
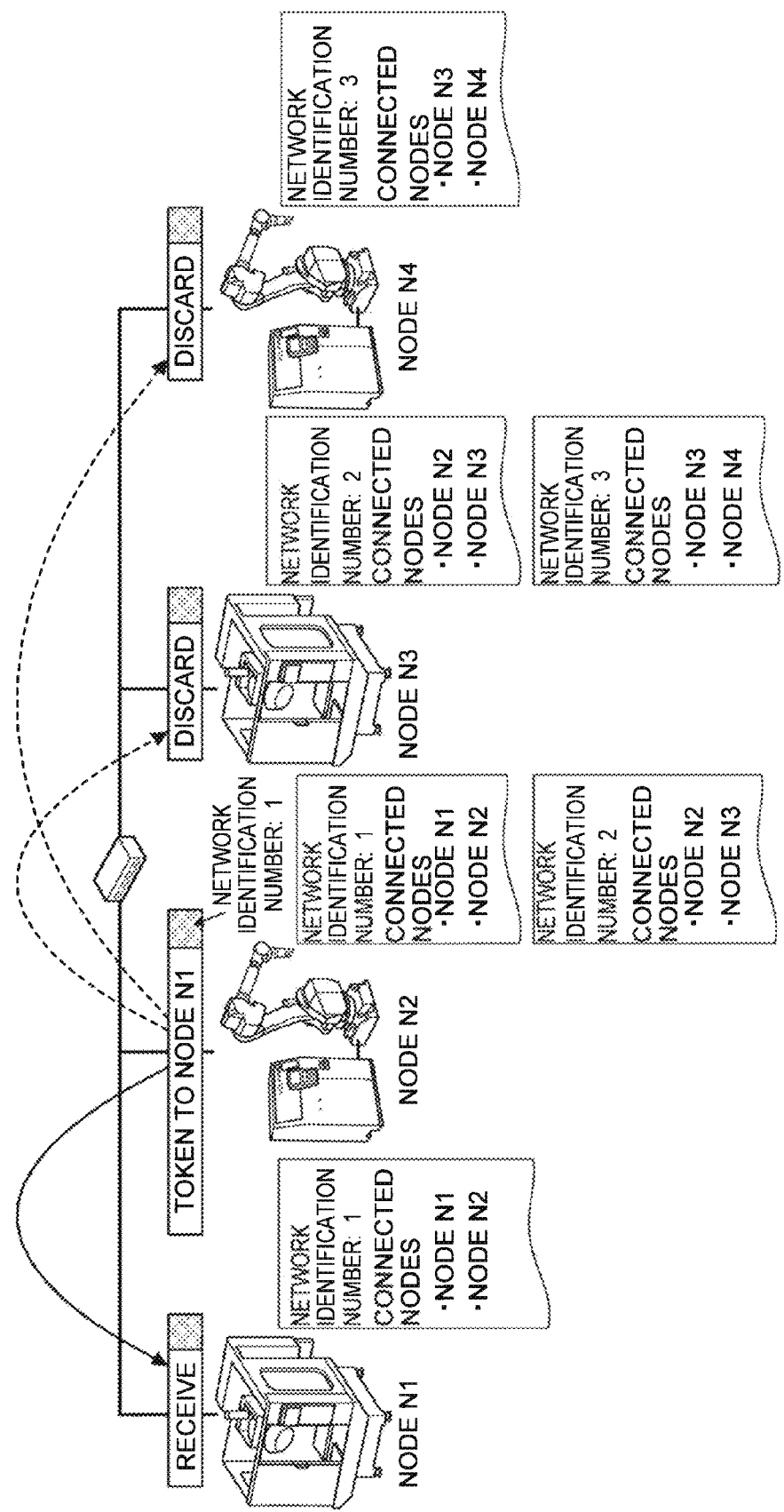
FIG. 7 is a view showing token transmission from the token-holding node N2 of the network group G1.

FIG. 7 is a view showing token transmission from the token-holding node N2 of the network group G1.

After transmitting the own-node data, the node N2 selects the node N1 as a next token-holding node from the connected node list of the network group G1, and generates a token frame (see FIG. 3) addressed to the node N1. The node N2 adds the network identification number 1 of the network group G1 to the generated token frame, and transmits the token frame to all the other nodes (nodes N1, N3, and N4) connected to the network by broadcasting.

The node N1 receives the frame transmitted from the node N2 because the frame contains a network identification number and the network identification number matches the network identification number of the network group to which the own node (node N1) belongs. The node N1 stores the token of the network group G1 in a token holding unit 12 (see FIG. 8) because the type of the received frame is a token and the token is addressed to the own node.

Each of the nodes N3 and N4 discards the frame transmitted from the node N2 because the frame transmitted from the node N2 contains a network identification number and the network identification number is different from the network identification number of the network group to which the own node (nodesN3, nodeN4) belongs.

Thus, in the network group G1 of the nodes N1 and N2, the token can be circulated between the nodes N1 and N2, data on the node N1 can be shared among the nodes N2, N3, and N4, and data on the node N2 can be shared among the nodes N1, N3, and N4.

The above description of the network group G1 of the nodes N1 and N2 also applies to the network group G2 of the nodes N2 and N3 and to the network group G3 of the nodes N3 and N4. Accordingly, as shown in FIG. 1, a token is circulated only between the nodes of each of the network groups of the nodes N1 and N2, the nodes N2 and N3, and the nodes N3 and N4, and data on each node can be shared among all the nodes N1, N2, N3, and N4.

Figure 8:
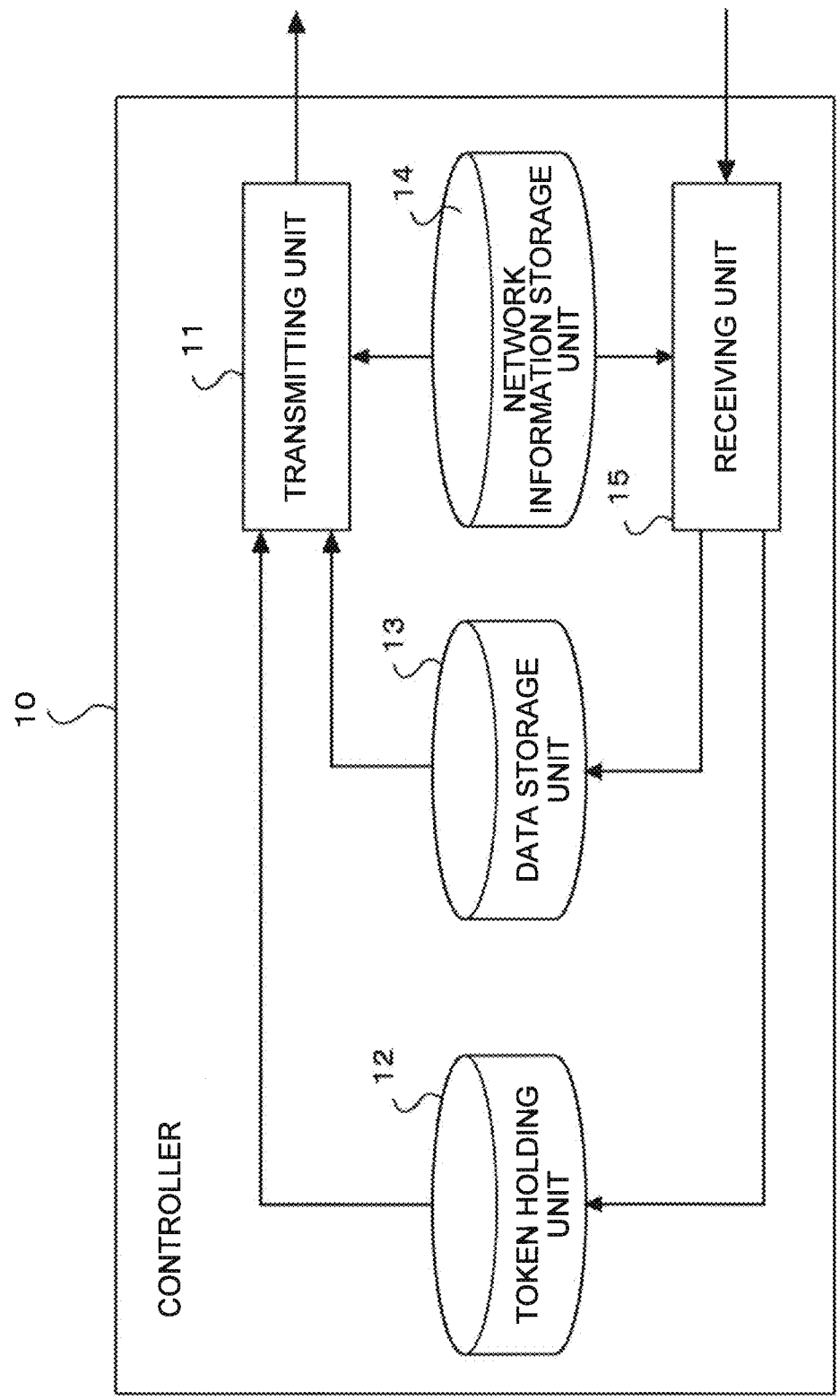
FIG. 8 is a diagram showing the internal configuration of one embodiment of a controller according to the present invention.

FIG. 8 is a diagram showing the internal configuration of one embodiment of a controller according to the present invention.

A controller 10 is connected to a plurality of other controllers through a network. The controller 10 is a numerical controller for controlling a machine tool, a robot controller for controlling a robot, or a programmable logic controller. The controller 10 includes means for circulating a token among a plurality of nodes, which are a plurality of controllers connected to the network, to share data on each node.

The controller 10 includes a data storage unit 13, a network information storage unit 14, a token holding unit 12, a transmitting unit 11, and a receiving unit 15. The data storage unit 13 shares data among a plurality of nodes connected to the network. The network information storage unit 14 stores at least one set of network information containing a network identification number for identifying at least one network group including the own node and at least one other node specified in advance, of the nodes connected to the network, and a connected node list of the network group to which the own node belongs. The token holding unit 12 holds a token of the network group to which the own node belongs. The transmitting unit 11 performs transmission to all the other nodes connected to the network. The receiving unit 15 performs reception from other node connected to the network.

Figure 9:
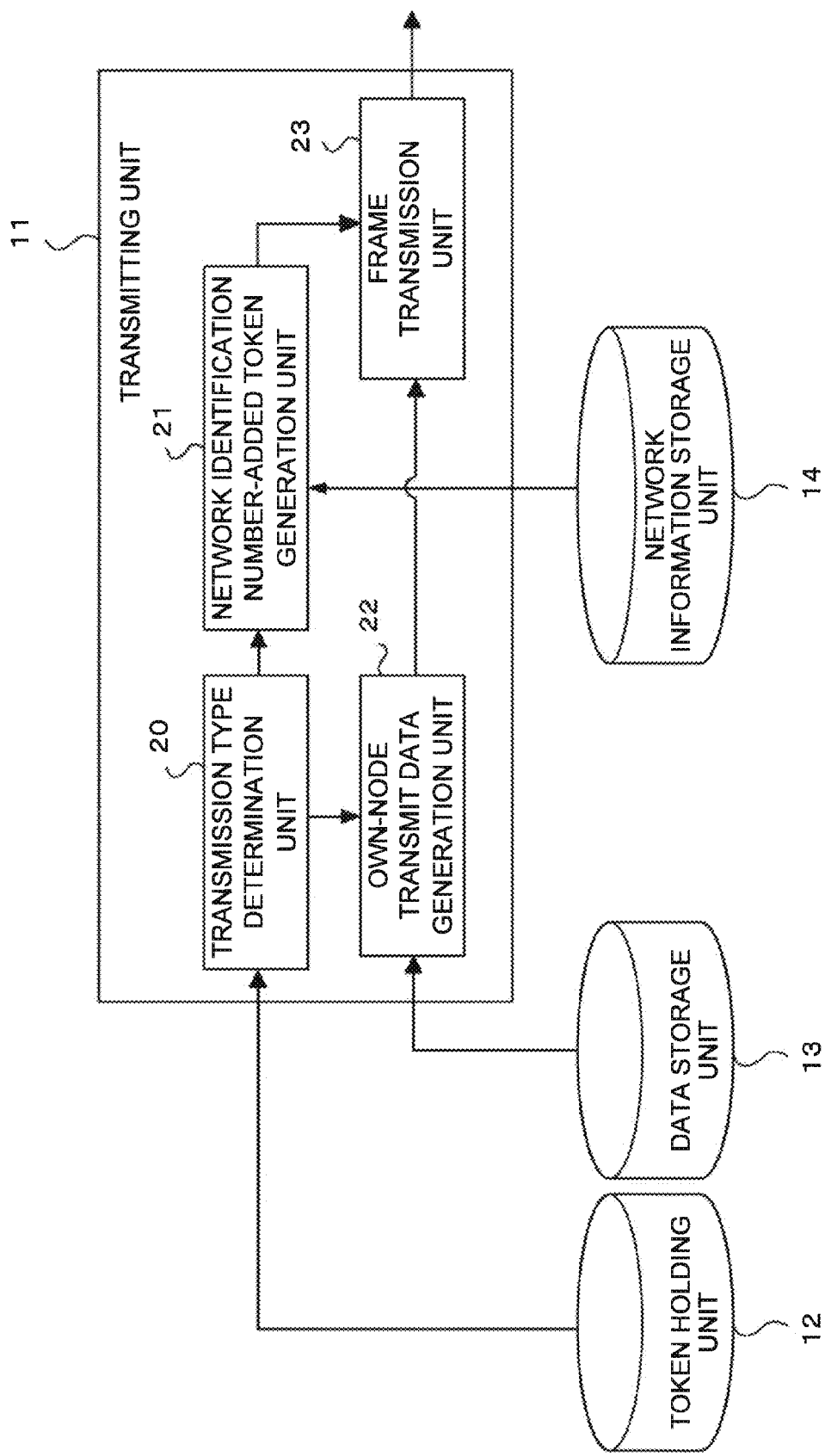
FIG. 9 is a diagram showing the internal configuration of a transmitting unit of the controller of FIG. 8.

FIG. 9 is a diagram showing the internal configuration of the transmitting unit 11 of the controller 10 of FIG. 8.

The transmitting unit 11 includes a transmission type determination unit 20, an own-node transmit data generation unit 22, a network identification number-added token generation unit 21, and a frame transmission unit 23. The transmission type determination unit 20 determines the type (token or data) of a frame to be transmitted. The own-node transmit data generation unit 22 obtains own-node data from the own-node data region of the data storage unit 13 and generates an own-node data frame if the type of the frame to be transmitted is data. The network identification number-added token generation unit 21 selects a next token-holding node from a connected node list of a network group holding a token, generates a token frame addressed to the next token-holding node, and adds the network identification number of the network group holding the token to the generated token frame if the type of the frame to be transmitted is the token. The frame transmission unit 23 transmits the frame to be transmitted to all the other nodes connected to the network by broadcasting.

Figure 10:
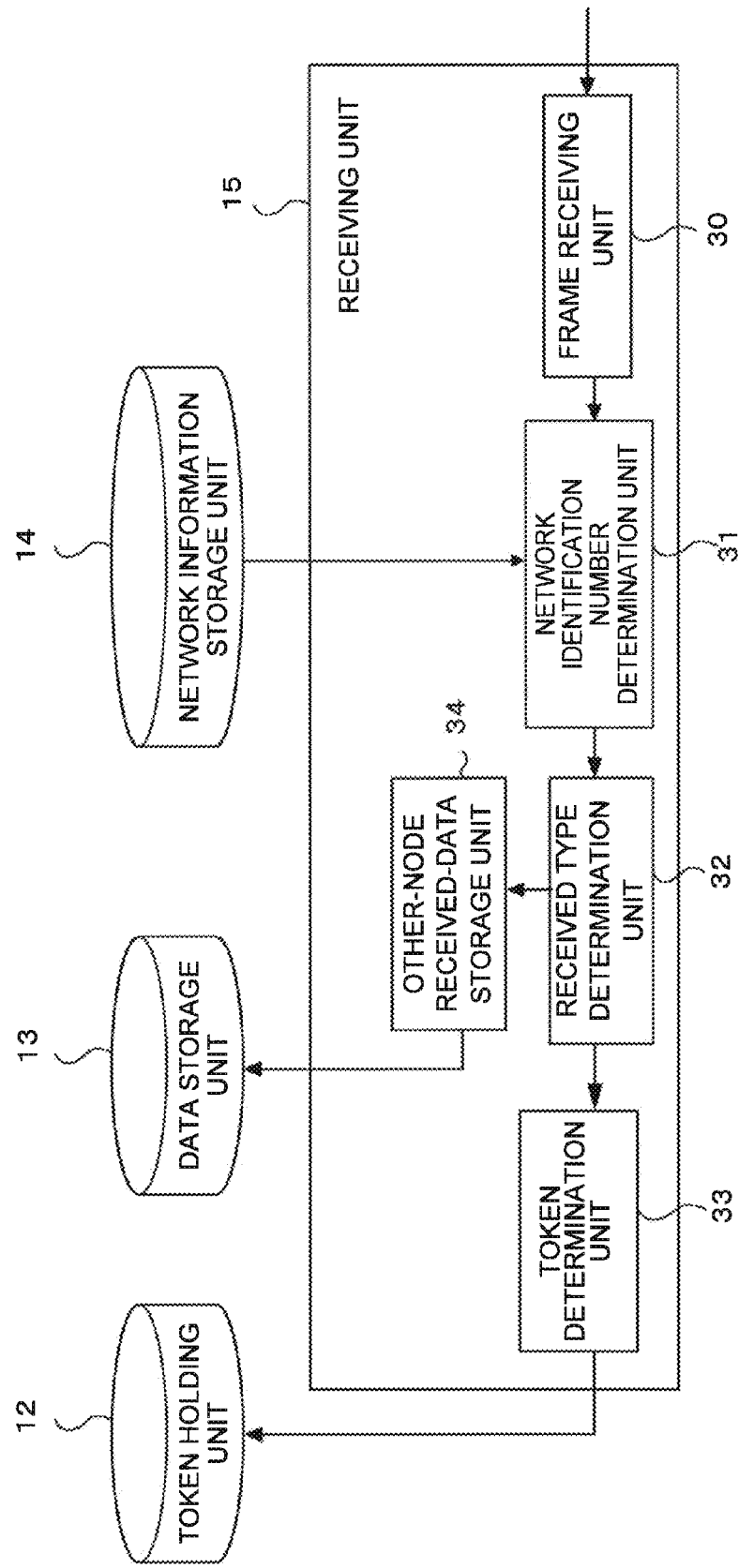
FIG. 10 is a diagram showing the internal configuration of a receiving unit of the controller of FIG. 8.

FIG. 10 is a diagram showing the internal configuration of the receiving unit 15 of the controller 10 of FIG. 8.

The receiving unit 15 includes a frame receiving unit 30, a network identification number determination unit 31, a received type determination unit 32, an other-node received-data storage unit 34, and a token determination unit 33. The frame receiving unit 30 receives a frame from other node connected to the network. The network identification number determination unit 31 checks whether or not the received frame contains the network identification number of the network group to which the own node belongs, and discards the received frame if the received frame contains a network identification number different from the network identification number of the network group to which the own node belongs. The received type determination unit 32 determines the type (token or data) of the received frame. The other-node received-data storage unit 34 obtains source node data from the data frame, if the type of the received frame is data, and stores the source node data in a source node area among other-node areas of the data storage unit 13. The token determination unit 33 checks whether or not the received frame is a token addressed to the own node if the type of the received frame is the token, and stores the token of the network group identified with the network identification number contained in the token in the token holding unit 12 if the frame is a token addressed to the own node.

Figure 11:
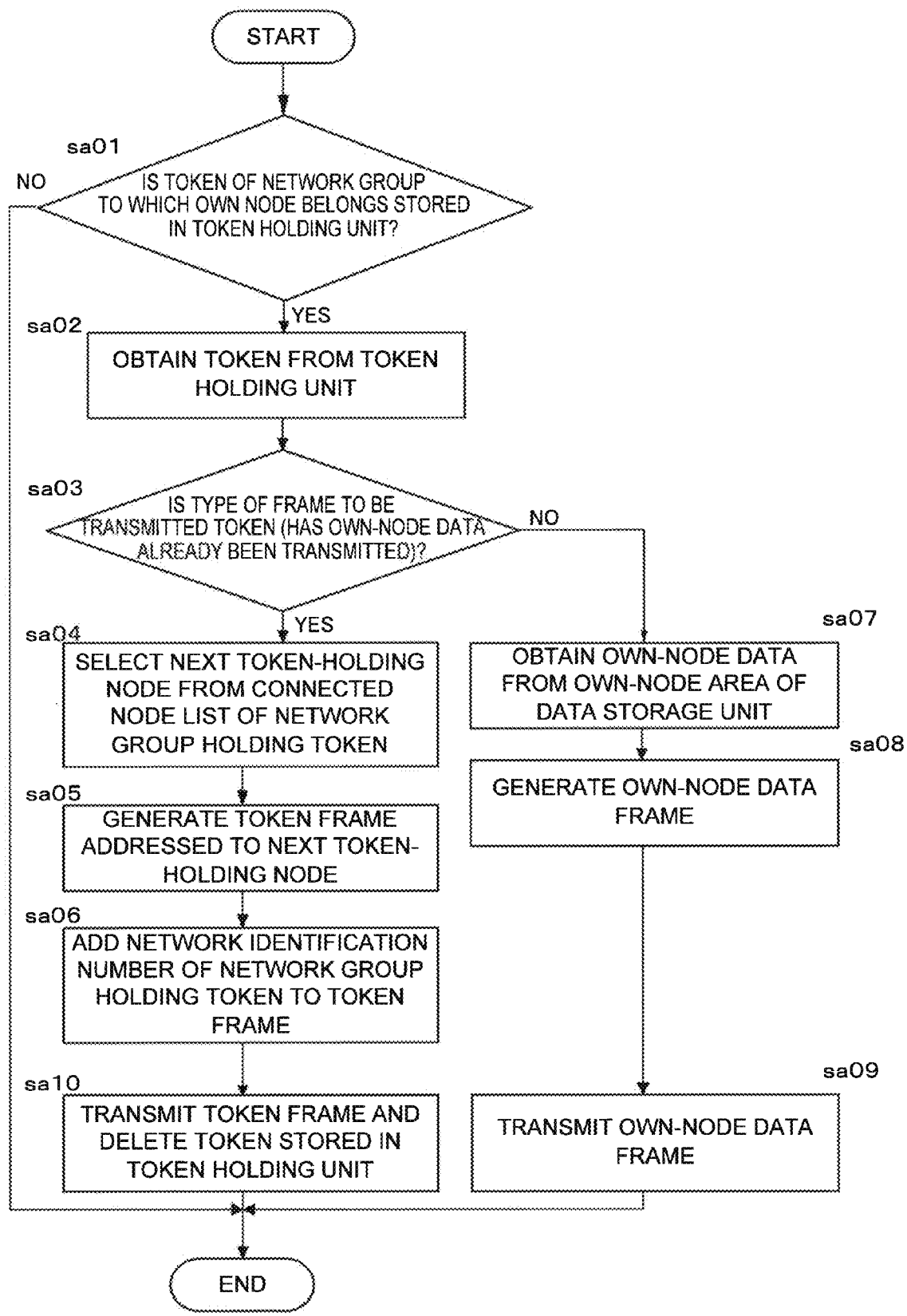
FIG. 11 is a flowchart showing a processing flow in the transmitting unit of the controller of FIG. 8.

FIG. 11 is a flowchart showing a processing flow in the transmitting unit 11 of the controller 10 of FIG. 8. The flowchart of FIG. 11 will be described step by step below.

[Step sa01] A determination is made as to whether or not the token of the network group to which the own node belongs is stored in the token holding unit 12. If the token is stored (YES), the procedure proceeds to step sa02. If the token is not stored (NO), the processing is ended.

[Step sa02] The token is obtained from the token holding unit 12.

[Step sa03] A determination is made as to whether the type of a frame to be transmitted is a token or not (whether or not own-node data has already been transmitted). If the type of the frame to be transmitted is the token (YES), the procedure proceeds to step sa04. If the type of the frame to be transmitted is not the token (NO), the procedure proceeds to step sa07.

[Step sa04] A next token-holding node is selected from the connected node list of the network group holding the token.

[Step sa05] A token frame addressed to the next token-holding node is generated.

[Step sa06] The network identification number of the network group holding the token is added to the token frame, and the procedure proceeds to step sa10.

[Step sa07] Own-node data is obtained from the own-node area of the data storage unit 13.

[Step sa08] An own-node data frame is generated, and the procedure proceeds to step sa09.

[Step sa09] The own-node data frame is transmitted, and the processing is ended.

[Step sa10] The token frame is transmitted, and the token stored in the token holding unit 12 is deleted. Then, the processing is ended.

Figure 12:
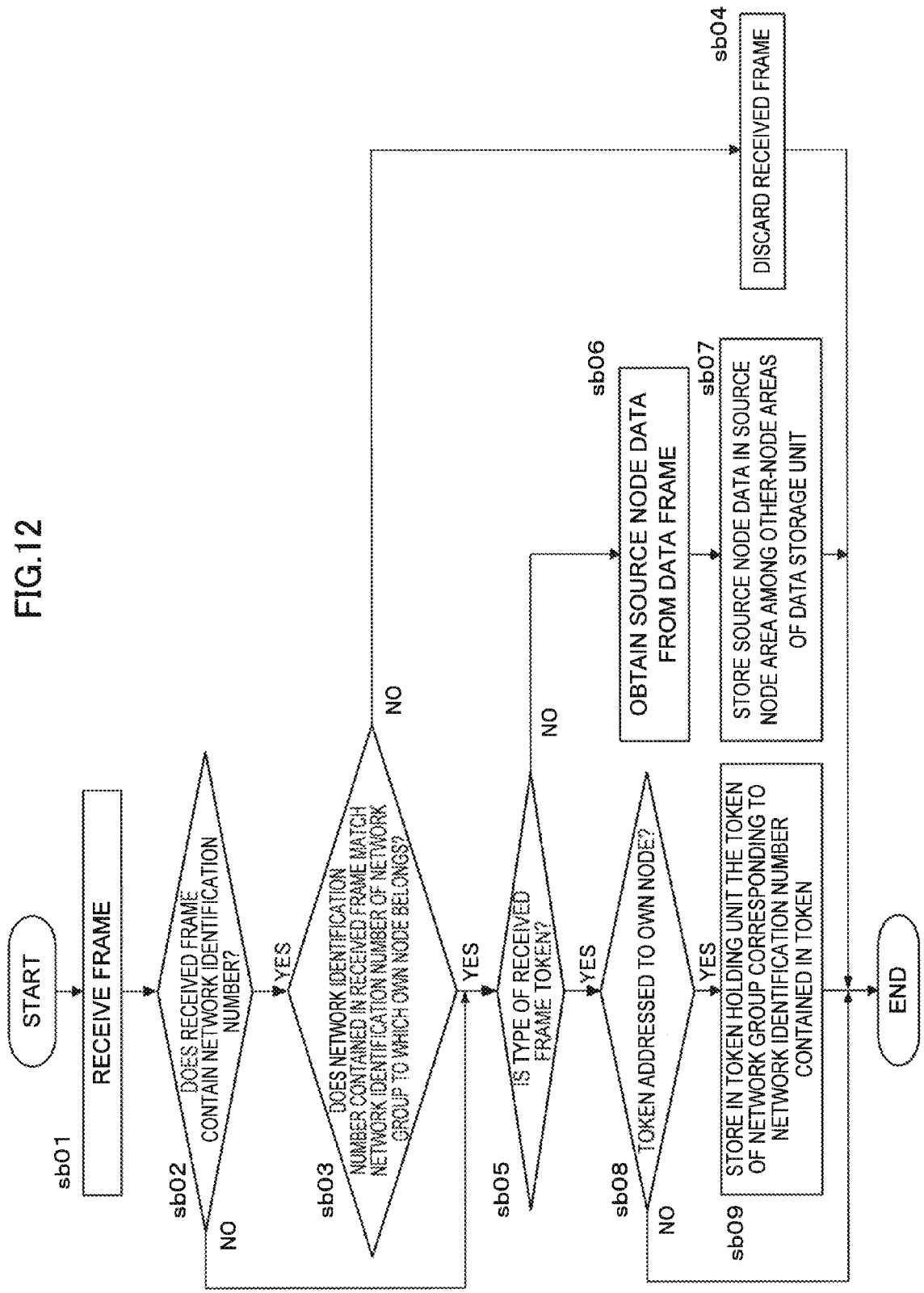
FIG. 12 is a flowchart showing a processing flow in the receiving unit of the controller of FIG. 8.
Figure 13:
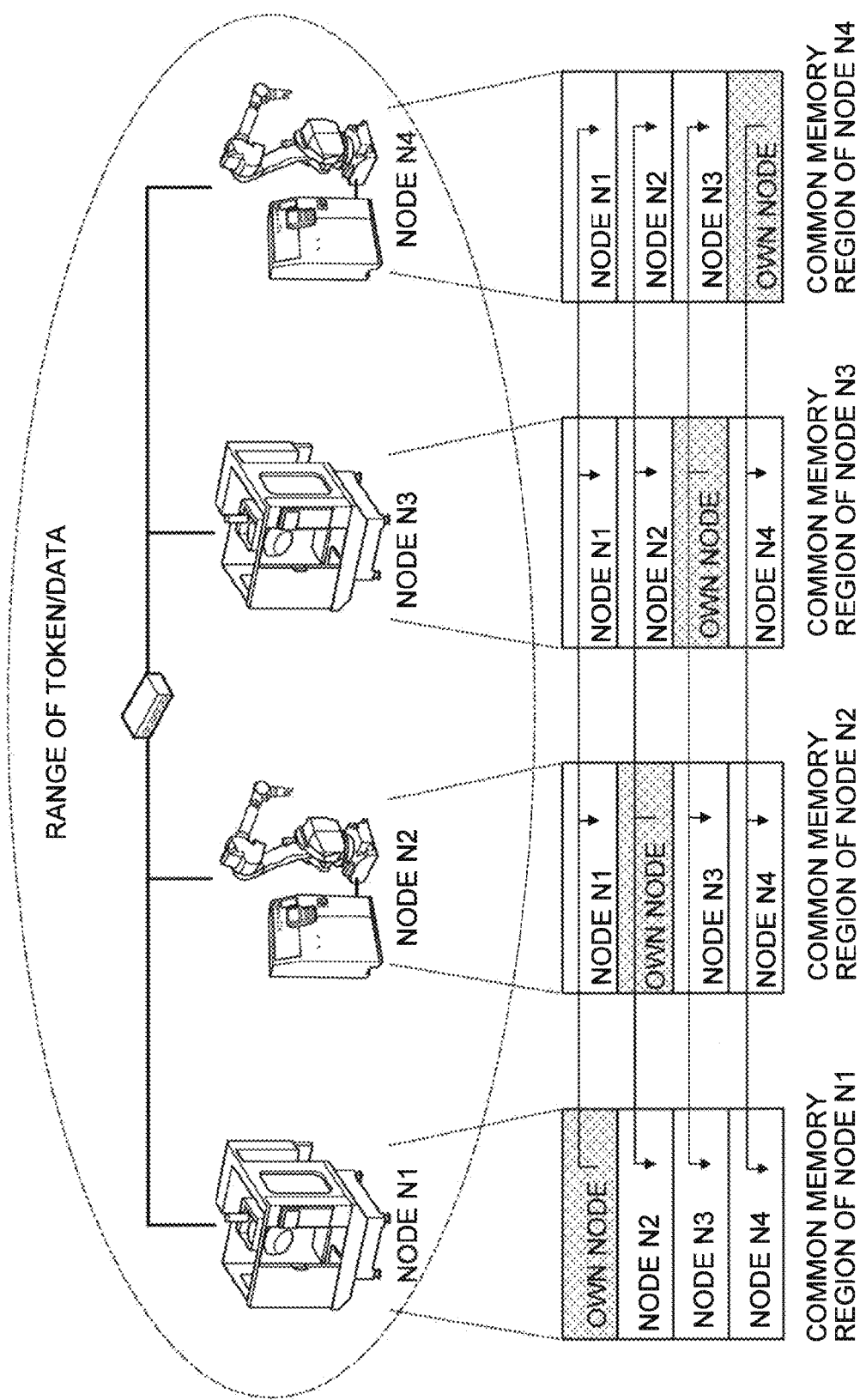
FIG. 13 is a view showing data sharing on a network employing a common memory system.
Figure 14:
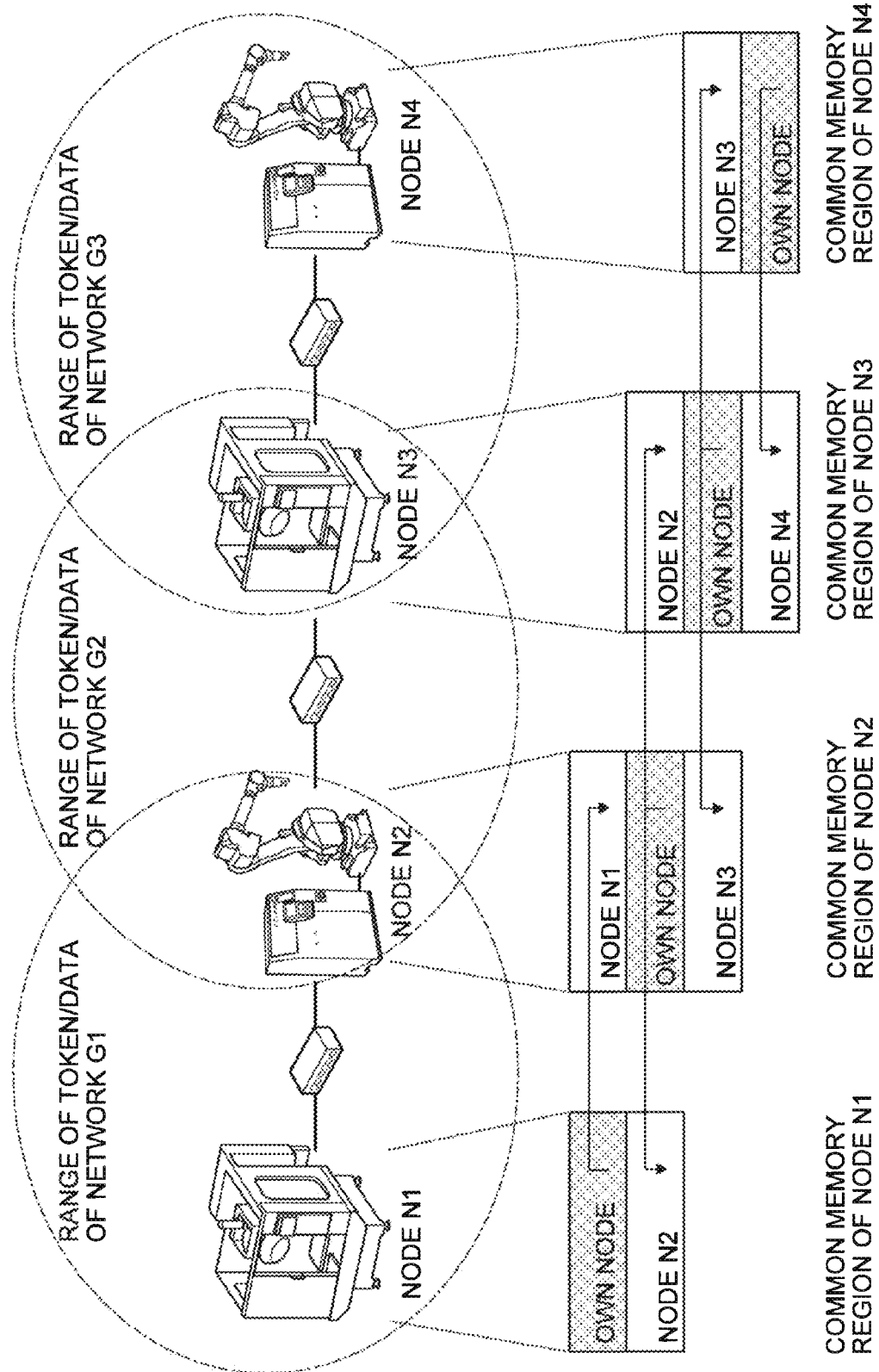
FIG. 14 is a view showing data sharing for the case where a network is physically divided.

FIG. 12 is a diagram showing a flowchart of processing in the receiving unit 15 of the controller 10 of FIG. 8. The flowchart of FIG. 12 will be described step by step below.

[Step sb01] A frame is received.

[Step sb02] A determination is made as to whether or not the received frame contains a network identification number. If the received frame contains a network identification number (YES), the procedure proceeds to step sb03. If the received frame does not contain a network identification number (NO), the procedure proceeds to step sb05.

[Step sb03] A determination is made as to whether or not the network identification number contained in the received frame matches the network identification number of the network group to which the own node belongs. If the network identification number contained in the received frame matches the network identification number of the network group to which the own node belongs (YES), the procedure proceeds to step sb05. If the network identification number contained in the received frame does not match the network identification number of the network group to which the own node belongs (NO), the procedure proceeds to step sb04.

[Step sb04] The received frame is discarded, and the processing is ended.

[Step sb05] A determination is made as to whether the type of the received frame is a token or not. If the type of the received frame is the token (YES), the procedure proceeds to step sb08. If the type of the received frame is not the token (NO), the procedure proceeds to step sb06.

[Step sb06] Source node data is obtained from the data frame.

[Step sb07] The source node data is stored in a source node area among the other-node areas of the data storage unit 13, and the processing is ended.

[Step sb08] A determination is made as to whether or not the received frame is a token addressed to the own node. If the received frame is the token addressed to the own node (YES), the procedure proceeds to step sb09. If the received frame is not the token addressed to the own node (NO), the processing is ended.

[Step sb09] The token of the network group corresponding to the network identification number contained in the token is stored in the token holding unit 12, and the processing is ended.

As described above, in the present invention, all nodes connected to a network are divided into defined network groups but only logically divided. Accordingly, all the nodes can communicate with each other. Compared to the entire network, each network group contains a smaller number of nodes among which a token is circulated, and therefore has a shorter token circulation cycle and a shorter communication cycle time. Data can be shared on the entire network irrespective of each network group. Thus, the communication cycle time of the entire network can be reduced while data is shared among all the nodes.

Moreover, in the present invention, since a token circulates in each network group, the data update cycle of nodes can be adjusted for each network group. For example, it becomes possible to create a network group having a short data update cycle and a network group having a long data update cycle and to classify each node into a network group in accordance with the data update cycle. This eliminates communications with needlessly short data update cycles, and can reduce the load on the network.

The invention claimed is:

1. A controller configured to circulate a token among a plurality of nodes and allow data on each node to be shared, the plurality of nodes being a plurality of controllers connected to a network, the controller comprising:
   a data storage unit for sharing data among the plurality of nodes connected to the network;
   a network information storage unit for storing at least one set of network information containing a network identification number for identifying at least one network group including own node and at least one other node specified in advance, of the nodes connected to the network, and a connected node list of the network group to which the own node belongs;
   a token holding unit for holding a token of the network group to which the own node belongs;
   a transmitting unit for performing transmission to the all the other nodes connected to the network; and a receiving unit for performing reception from the other node connected to the network, wherein the transmitting unit includes:

a transmission type determination unit for determining a type of a frame to be transmitted;

an own-node transmit data generation unit for obtaining own-node data from an own-node data region of the data storage unit and generating an own-node data frame if it is determined that the type of the frame to be transmitted is data;

a network identification number-added token generation unit for, if it is determined that the type of the frame to be transmitted is a token, selecting a next token-holding node from a connected node list of the network group that holds the token, generating a token frame addressed to the next token-holding node, and adding the network identification number of the network group to the generated token frame; and a frame transmission unit for transmitting the frame to be transmitted to all the other nodes connected to the network by broadcasting, and the receiving unit includes:

a frame receiving unit for receiving a frame from other node connected to the network;

a network identification number determination unit for checking whether or not the received frame contains the network identification number of the network group to which the own node belongs, and discarding the received frame if the received frame contains a network identification number different from the network identification number of the network group to which the own node belongs;

a received type determination unit for determining a type of the received frame;

an other-node received-data storage unit for, if it is determined that the type of the received frame is data, obtaining source node data from the data frame and storing the obtained source node data in a source node area among other-node areas of the data storage unit; and a token determination unit for, if it is determined that the type of the received frame is a token, checking whether or not the token is addressed to the own node, and storing in the token holding unit the token of the network group identified with the network identification number contained in the token if the token is addressed to the own node.

* * * * *